Dec. 11, 1945.  E. J. B. KNEBEL  2,390,717
MANUFACTURE OF VINEGAR
Filed Jan. 11, 1943
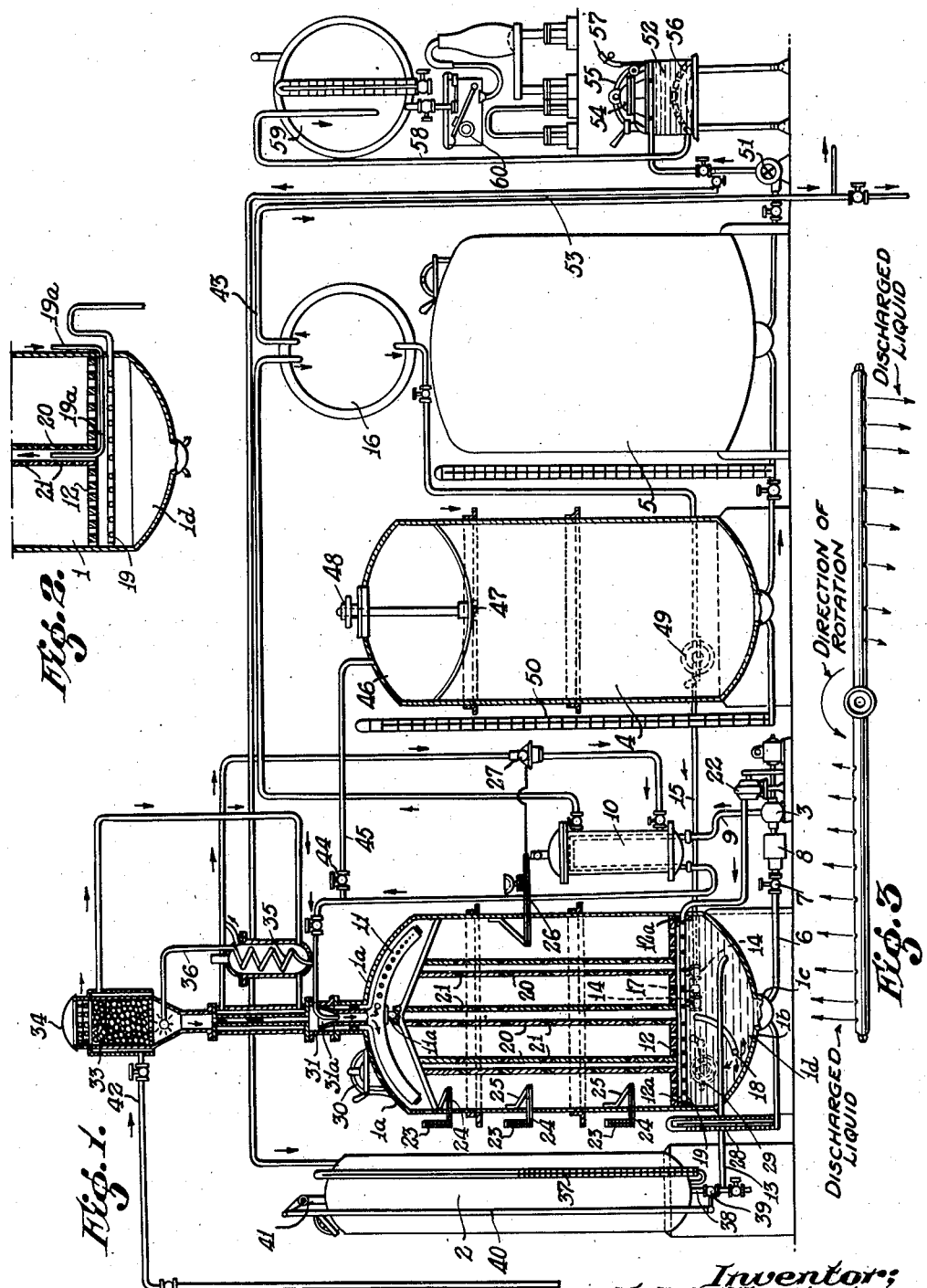
Inventor:
E. J. B. Knebel,
by Glascock Downing & Seybold
Att'ys Patented Dec. 11, 1945

2,390,717

UNITED STATES PATENT OFFICE 2,390,717

MANUFACTURE OF VINEGAR

Ernst Julius Bruno Knebel, Upsala, Sweden

Application January 11, 1943, Serial No. 472,065
In Sweden August 21, 1940

3 Claims. (Cl. 99—245)

Hitherto, the manufacture of vinegar has generally been effected in comparatively small fermenting-vats made from wood or earthenware or, in some exceptional cases, from metal capable of resisting corrosion. In order to attain a sufficient capacity, a large number of such vats must be provided for each plant, these vats being interconnected through a number of pipe conduits. It is consequently difficult to supervise the manufacture which is easily liable to disturbances in operation. The operating conditions are much simplified, if the fermentation is carried out in a single or only a small number of very large vessels having a volume of, for instance 70,000 to 400,000 litres. However, in order to attain good yields in these large vessels, it is necessary to arrange and to conduct the various cooperating parts of the plant in a definite manner. The present invention provides arrangements for this purpose, which aim at avoiding evaporation losses and losses in yield.

The invention accordingly relates to a method of manufacturing vinegar by fermentation of alcohol in a fermenting vessel filled with chips or other filler bodies and supplied with air, the mash being pumped from a lower collecting space through an external temperature regulator into the upper portion of the fermenting vessel. According to the invention a portion of the circulating mash is conveyed, if desired after having been cooled down, through a nozzle or the like to a gas outlet of the fermenting vessel, so as to cool and to condense the vinegar and alcohol vapours escaping through this outlet, whereupon the condensate together with the mash is caused to flow into a spraying device provided at the top of the fermenting vessel.

Preferably, the quantity of the circulating mash is maintained substantially constant, and the temperature of the fermenting layers is controlled automatically by means of a temperature regulator associated with a thermostat-controlled cooling-water valve.

The invention also relates to apparatus for carrying the method above described into effect. According to one feature of the apparatus the top and the bottom of the fermenting vessel are of domed form and are preferably of metal, and the spraying device consists of a rotary sprayer arm or a rotary cross, the shape of which is adapted to suit the curvature of the domed top. A further feature consists in the provision of mainly vertical air passages in the fermenting vessel, these air passages being perforated at intervals and extending through the vessel up to the proximity of the sprayer device, one or more of these air passages serving at the same time as supports for the spraying device. Further features will be apparent from the following description with reference to the accompanying drawing illustrating one embodiment of a plant according to the invention.

Figure 1 shows the plant by way of diagrammatic representation, and Figures 2 and 3 are details.

The fermentation of the vinegar is effected in a fermenting vessel 1, which may be entirely of stainless steel, and which may have a volume sufficient to render possible a daily manufacture of, for instance 5,000 litres of vinegar of ten percent, in a single vessel of the type in question. Alcohol diluted to a suitable extent is introduced into the lower portion of the vessel 1 from a reservoir 2. The alcohol mixture is pumped by means of a circulation pump 3 into the upper portion of the vessel 1, where it is distributed by means of a suitable spraying device, and is then allowed to flow down through the vessel 1, which is filled with chips or other filler bodies, the alcohol being then fermented at suitable temperature conditions into vinegar through the action of the air and the vinegar bacteria. In this manner, the liquid is caused to circulate the desired number of times through the vessel 1, until the desired percentage of vinegar has been reached, whereupon the vinegar produced is sterilized and transferred into one or more store containers 4, 5 and is finally filtered and tapped into suitable receptacles.

Preferably, the upper portion 1a of the fermenting-vessel 1 is domed or vaulted and is made of metal, thus enabling an enlargement of the cooling surface to be obtained, so that the vinegar and alcohol vapours collected in the upper portion of the vessel will readily become condensed, the condensate then again flowing down in the vessel. The bottom 1b of the vessel may also be domed or vaulted to facilitate cleaning of the vessel. Moreover, this construction avoids dead corners which may not come into contact with the circulation. Such corners exist in ordinary fermenting-vessels for vinegar due to the fact that the head members of the vessels are plane.

At the central portion of the bottom there is preferably formed a concave pit 1c to facilitate complete emptying of the vessel through the tapping pipe 6. This pipe leads through a cock 7 and a filter 8 to the pump 3 which pumps the liquid into a pipe 9 through a temperature-controlling device 10 and up into the top of the vessel 1, which is provided with a distributing device in the form of a rotary sprayer rim 11, constructed of stainless steel, for example. The sprayer is mounted in a dished bearing 11a, and the arms thereof are preferably curved downwardly so as to correspond to the domed shape of the part 1a. Each arm of the sprayer may be provided at its end thereof with a screw stopper whereby cleaning may readily be effected.

The filling rests on a filter bottom 12, which may be removably carried on angle irons 12a, secured to the inner walls of the vessel 1, for instance by being welded thereto. In this manner the use of special supports for the filter bottom are avoided. Such supports are common in fermenting-vessels as hitherto known but are inconvenient, inasmuch as they encroach upon the space in the lower portion of the vessel, which serves as a collecting space for the liquid flowing down. The alcohol is introduced into this collecting space 1d through a pipe 13, the open end of which is preferably eccentric to the space 1d. To dilute the alcohol to the desired concentration, water is supplied through a conduit 15 from a water reservoir 16, in which the water is maintained at a temperature of about 25° C. Before the water comes into the space 1d, it passes through a water meter 17, whereby the quantity of water supplied may be accurately measured and adjusted to the desired value by means of cocks 14. Preferably, the conduit 15, is connected within the space 1d with a horizontal or somewhat curved spraying pipe 18, which brings the outflowing water into violent circulation so as to bring about an intensive mixing of the alcohol and the water.

An effective mixture of this kind is of the utmost importance to ensure the fermentation proceeding without disturbance. The above described shape of the space 1d in addition to the fact that no screening supports are necessary for the filter bottom assists in effecting an intimate and rapid mixture.

Considerable quantities of air are consumed during the fermentation of the vinegar. Generally, this air is supplied through special draught apertures at various places in the wall of the fermentating-vessel. It has been found, however, that the distribution of the air in containers as large as those considered by the invention will not be satisfactory, and, moreover, the air supply in this manner does not enable sufficiently exact control. For this reason, in the present plant, the air is supplied through one or more distributing pipes 19 of an annular shape, for example, these distributing pipes projecting into the interior of the fermenting-vessel and supplying the air underneath or adjacent to the filter bottom 12 and, if desired, at other places as well. To ensure a uniform distribution of the air in the inner chip layers, there may be provided one or more vertical distributing channels or passages 20, which are open towards the space 1d and are provided with a number of downwardly directed air openings 21 distributed along the surface of the passages 20. The topmost air openings are at some distance below the uppermost surface of the chip layer, in order that the air shall not flow directly into the atmosphere. The air may be supplied by natural draught effect, but it is preferable to supply the air under pressure by means of a fan 22, whereby the supplied quantity of air is rendered fully controllable and may be regulated independently of the external temperature conditions. Furthermore, this will facilitate an intensified fermentation in certain circumstances. Preferably, the passages 20 also serve as carriers for the bearing 11a of the sprayer 11.

Due to interruption of electric current or the like it may happer that the pump 3 ceases to operate during the fermenting process. This would cause the mash to collect in the space 1d in continually increasing quantities so as finally to cover the perforations of the air supply pipe 19, the result being that the fermentation of vinegar would cease due to lack of air. In order to avoid this disadvantage an additional air pipe 19a (Figure 2), may be arranged to open into one or more of the air passages 20 above the highest level of the liquid in the collecting-space 1d. The air pipe 19a communicates permanently with the atmosphere so that air may be sucked into the fermentating mash when necessary.

Thermometers 23 are provided at suitable parts of the chip layer. To avoid breakage of the thermometers under the influence of the weight of the chips perforated protection sleeves 24 may be secured to the inner walls of the vessel 1 by means of brackets 25 or other supports.

Similarly, a protection tube for a feeler 26 may be provided for a thermostatically and electrically controlled cooling-water valve 27.

The fermenting-vessel is provided with a liquid-level gauge 28 and with lower and upper manhole doors 29 and 30 respectively, the latter door being provided with an observation window, if desired.

At the top, the vessel 1 communicates with the atmosphere through a pipe 31. To prevent loss of vinegar and alcohol vapours, a portion of this pipe is water-cooled as indicated at 32, and for the same purpose a condenser 33 may be provided at the outlet of the pipe 31. The final outlet is controllable, for instance, through a rotatable cover 34, provided with a number of holes adapted, according to the position of the cover, to uncover a larger or smaller opening area. Hereby the quantity of air passing through the fermenting vessel may be controlled. Furthermore in order to ensure complete condensation, a portion of the mixture of alcohol and vinegar circulated by means of the pump 3 may be cooled in a special cooler 35, and is then introduced through a conduit 36 into the pipe 31 in the form of a shower. The condensed liquid together with the mash returns to the vessel through the funnel-like inlet 31a of the sprayer 11.

The alcohol reservoir 2 is provided with a liquid-level gauge 37 and with a tapping pipe 38 opening at a distance above the bottom of the reservoir, so that slime and other impurities occurring in the alcohol will not be entrained in the tapping operation. When cleaning is to be effected, the pipe 38 is unscrewed. The tapping takes place when desired by means of a tapping cock 39 which is positively connected to an air admission valve 41 by means of a mechanical connection 40, so that the valve 41 is opened simultaneously with the cock 39. Hereby the advantage is obtained that the reservoir except in tapping and filling is completely cut off from the atmosphere, so that evaporating losses are avoided.

It is of the utmost importance for favourable accomplishment of the fermentation process that the proper temperature be maintained in the fermenting-vessel. In the apparatus as hitherto known, endeavours are made to maintain this temperature with the aid of a large number of electric contacts and valves adapted to control the circulating quantity of liquid as well as the quantity of cooling water. For the same purpose, it has been proposed to arrange a special intermediate receptacle which, however, would only complicate the plant. On account of the fact that hitherto the circulating quantity of liquid has been too small, it has not been possible to attain even an approximately uniform temperature in the different parts of the fermenting-vessel. Thus, the temperature in the upper portion generally is too low, and in the lower portion it is too high by reason of the fact that the insufficient quantity of circulating water must be cooled down too far to be able to remove the amount of heat developed during the fermentation process.

These disadvantages are avoided by the circulating liquid being large enough in quantity and by the liquid being kept approximately constant, while the control takes place solely through the single thermostat-controlled valve 27 adapted automatically to regulate the quantity of cooling water to the temperature regulator 10. Thus, there is no substantial alteration of the quantity of circulating vinegar mixture, as is the case in the known arrangements. The cooling water is taken from a cold-water pipe 42 through coolers 32, 33 and 35, and the escaping water (which has thus become heated) is supplied to the water reservoir 16, which is provided with an outlet 43. The temperature regulator 10 may be heated in any suitable manner.

The pump 3 serves not only as a circulation pump but also to pump the manufactured vinegar to the store receptacles. For this purpose, there is provided a pipe 45 controlled by a cock 44, and extending to the receptacle 4. The sterilization of the vinegar, which must be undertaken prior to storage, is effected in the temperature regulator 10, which is then heated by steam to 60°-80° C. As it is not desirable to supply this warm vinegar directly to the stored vinegar, inasmuch as the cooling would then take place too rapidly, and a repeated heating of the stored liquid is not desirable, the upper portion of the receptacle 4 is arranged as a sterilization chamber 46. This chamber is provided with an outlet to the store receptacle proper, this outlet being controlled by means of a valve 47. The sterilization having been completed, the valve 47 is opened, an air valve 48 connected with this valve being opened at the same time, so that no vacuum will be produced.

The walls and the bottom of the store receptacle are connected in substantially the same manner as those of the fermenting-vessel. There may be provided a manhole door 49 and a liquid-level gauge 50. The store receptacle 5 is of similar construction although in this case there is no sterilization chamber. If desired a further number of store receptacles may be provided.

The sterilized vinegar is pumped by means of the pump 51 from the store receptacle through a filter 52. A pipe 53 is also extended from the pump to the alcohol reservoir 2 to permit mixing of the alcohol with vinegar for the purpose of effecting denaturing.

Preferably, the filter 52 is constructed as a layer filter, the various filter layers placed on top of each other being packed in flat bags of suitable filter cloth, which are inserted into the filtering receptacle and may be readily taken out for cleaning, which may be effected simply by washing the bags with water. The filtering receptacle is provided with a lid 54 which may be closed by means of a clamp arm 55 and a screw. As an upper filter layer, vitreous sand or sea-sand is made use of, for example, which on account of its own weight presses the lower filter layers against the filter walls, which lower layers may consist of asbestos, wood or paper fibres or of wood or bone charcoal, or of siliceous marl—each layer being housed in its own bag. The lowermost layer rests on a domed filter bottom 56. The shape of this filter bottom has been selected for the purpose of obtaining a larger filter surface and so that the lowermost filter layer shall be securely pressed against the walls of the filter receptacle and prevent by-passing of non-filtered liquid. A vent from the filter is shown at 57, this vent being adapted to be closed when required.

The filtered and sterilized vinegar flows from the filter through a pipe 58 to a vinegar reservoir 59 and thence to a filling apparatus for bottles or casks.

It should be noted that the invention is not restricted to the embodiments now illustrated and described by way of examples.

What I claim is:

1. In an apparatus for manufacturing vinegar of the kind described the combination of a fermenting vessel having a vapour outlet at the top thereof, an external circulation conduit connected with the lower part of said fermenting vessel, and with a nozzle arranged in the said vapour outlet to introduce the mash therein so as to condense and cool vapours in the outlet, and means to convey fermenting mash through said conduit from the lower part to the outlet of said fermenting vessel and a distributing device arranged in the interior of the fermenting vessel at the top thereof the supply of which opens into the vapour outlet.

2. In an apparatus for manufacturing vinegar of the kind described the combination of a fermenting vessel having domed top and bottom, a vapour outlet communicating with said top, an external circulation conduit communicating with said bottom and with means to introduce at least a portion of the circulating mash into said outlet in a finely divided state so as to condense and cool vapours in the outlet, and a distributing device arranged in the interior of said fermenting vessel at the top thereof the supply of which opens into the vapor outlet and communicating with said outlet.

3. In an apparatus for manufacturing vinegar of the kind described the combination of a fermenting vessel substantially made from metal and having domed top and bottom, a vapour outlet from said top, an external circulation conduit communicating with said bottom and with said outlet, and a distributor arm arranged in the interior of said fermenting vessel at the top the supply of which opens into the vapor outlet and communicating with said circulation conduit and having a curvature approximately corresponding to the shape of said domed top.

4. In an apparatus for manufacturing vinegar of the kind described the combination of a fermenting vessel having a vapour outlet at the top thereof, an external circulation conduit connected with the bottom space of said fermenting vessel and with means to introduce at least a portion of the circulation mash into said outlet in a finely divided state so as to condense and cool vapours in the outlet, and a distributing device arranged in the interior of said fermenting vessel at the top thereof the supply of which opens into the vapour outlet, and cooling means adapted to regulate the temperature of the mash circulating in the circulation conduit.

5. In an apparatus for manufacturing vinegar of the kind described the combination of a fermenting vessel having a vapour outlet at the top thereof, an external circulation conduit connected with the lower part of said fermenting vessel and opening into the said vapour outlet, vertical, perforated air passages provided within the fermenting vessel, and a rotatable distributing device arranged in the interior of said vessel at the top thereof and carried by one of said air passages.

6. In an apparatus for manufacturing vinegar of the kind described the combination of a fermenting vessel having a vapour outlet at the top thereof, an external circulation conduit connected with the bottom of said fermenting vessel and communicating with the said vapour outlet, vertical, perforated air passages provided in the fermenting vessel, a collecting space at the bottom of said fermenting vessel and at least one additional air supply pipe permanently in communication with the atmosphere and arranged to open into said air passages above the highest liquid level in the collecting space.

7. In an apparatus for manufacturing vinegar of the kind described the combination of a fermenting vessel having a vapour outlet at the top thereof, an external circulation conduit connected with the bottom of said fermenting vessel and communicating with the said vapour outlet, a funnel-shaped collector for mash and condensate provided in the vapour outlet, and a distributing device arranged in the interior of said fermenting vessel at the top thereof and communicating with said funnel-shaped collector.

8. In an apparatus for manufacturing vinegar of the kind described the combination of a fermenting vessel having a vapour outlet at the top thereof, an external circulation conduit connected with the bottom of said fermenting vessel and communicating with the said vapour outlet, openings arranged at the top of said vapour outlet, and controlling means to regulate the area of said openings.

ERNST JULIUS BRUNO KNEBEL.